May 25, 1948.  E. McCORMICK  2,442,306
FLUID POWER UNIT
Filed Aug. 13, 1945  2 Sheets-Sheet 1
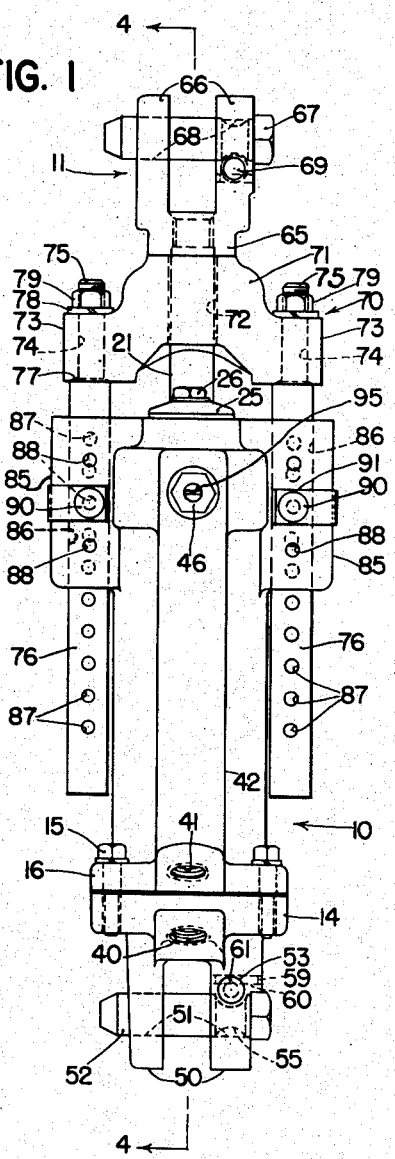
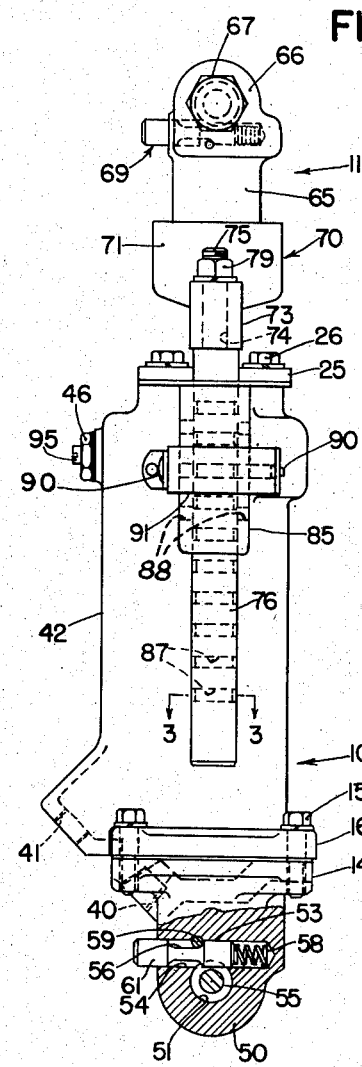
INVENTOR.
ELMER McCORMICK
BY
ATTORNEYS.

May 25, 1948.　　　　　E. McCORMICK　　　　　2,442,306
FLUID POWER UNIT
Filed Aug. 13, 1945　　　　2 Sheets-Sheet 2
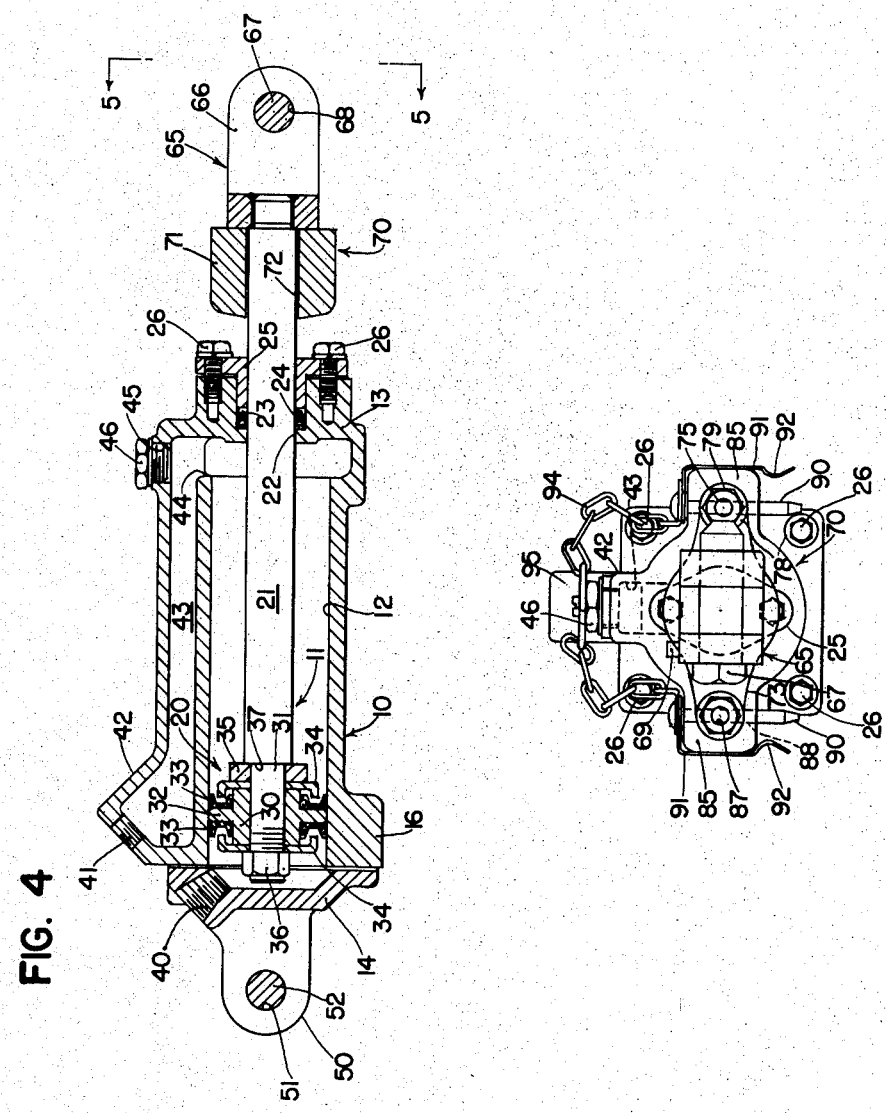
INVENTOR.
ELMER McCORMICK
BY
ATTORNEYS.

Patented May 25, 1948

2,442,306

UNITED STATES PATENT OFFICE 2,442,306

FLUID POWER UNIT

Elmer McCormick, Waterloo, Iowa, assignor to Deere Manufacturing Co., a corporation of Iowa Application August 13, 1945, Serial No. 610,582

4 Claims. (Cl. 121—38)

The present invention relates generally to fluid power units and more particularly to units of the type comprising a cylinder and a piston slidable axially therein, such as is used for moving a load in connection with a hydraulic or pneumatic control system. The particular embodiment which I have in mind is a hydraulically actuated cylinder for use in power operated control of implements associated with a tractor, although I do not intend my invention to be limited to this particular embodiment. Hydraulic control systems of this general type are used for shifting an implement, such as a cultivator, plow, or the like, from a normal working position in engagement with the ground to a raised transport position, and vice versa. Some implements are mounted directly upon the tractor, while others are mounted on their own wheels in trailing relation to the tractor, but in either case they are provided with an actuating lever to which a control cylinder and piston assembly can be connected for controlling the implement.

As is well known to those skilled in the art, it is desirable to adjust the implement to a predetermined depth of operation in the ground, as in the case of a cultivator or plow, or a predetermined elevation above the ground, as in the case of a harvesting implement, to which position the implement automatically returns each time it is lowered out of the raised transport position.

The principal object of my invention relates to the provision of a fluid power unit in which is incorporated an adjustable limit stop for positively determining the extent of relative movement between the piston and cylinder members.

Another object relates to the provision of a fluid actuated piston and cylinder assembly with an axially adjustable device for limiting the extent of movement of the piston as it moves into the cylinder.

My invention can be applied either to cylinders of the single acting type in which fluid pressure is applied only to one side of the piston when raising the implement, while the weight of the implement is used to return the piston to a normal working position in the cylinder when the implement is lowered, or to a double acting piston and cylinder assembly in which the fluid pressure can be applied to either side of the piston, selectively, thus providing for applying pressure when lowering the implement, to force the latter to the ground. In the latter case, the adjustable limit stop is adapted to positively limit the movement of the piston in the cylinder during he lowering stroke and is adapted to be used in connection with a hydraulic circuit provided with means for relieving the pressure in the cylinder when the pressure exceeds a normal value, as is well known to those skilled in the art.

These and other objects and advantages of my invention will be apparent to those skilled in the art after a consideration of the following description, in which reference is had to the drawings appended hereto, in which Figure 1 is a top plan view of a double acting piston and cylinder assembly embodying the principles of the present invention;

Figure 2 is a side elevational view of the fluid power unit, a portion of the mounting bracket being broken away to show the details of construction;

Figure 3 is a sectional view taken along a line 3—3 in Figure 2 and drawn to an enlarged scale;

Figure 4 is a sectional elevational view, taken along a line 4—4 in Figure 1; and Figure 5 is an end view taken along a line 5—5 in Figure 4.

Referring now to the drawings, the fluid power unit comprises a cylinder member and a piston member, indicated generally by reference numerals 10, 11, respectively. The cylinder member 10 contains a cylindrical pressure chamber 12, within which the piston member 11 is slidable axially. The member 10 is preferably in the form of a casting and has a cylinder head portion 13, preferably formed integrally therewith at one end of the pressure chamber 12. The opposite end of the pressure chamber 12 is closed by means of a detachable cylinder head 14, which is secured by bolts 15 to a flange 16, formed integrally with the cylinder casting.

The piston member 11 comprises a piston 20 mounted on one end of a piston rod 21, which extends axially out through an opening 22 in the closed end 13 of the cylinder. The opening 22 is sealed by means of a sealing gland 23, which is secured within an annular recess 24 surrounding the rod 21. The gland 23 is compressed within the recess 24 by means of a retaining member 25 secured by bolts 26 to the end of the cylinder member 10.

The piston 20 comprises a metal sleeve 30 mounted on an end portion 31 of the rod 21, turned to a reduced diameter. The sleeve 30 has a radially extending annular flange 32, which fits slidably within the cylinder 12 and supports a pair of annular sealing members 33 on opposite sides thereof, respectively. The sealing members are retained adjacent the flange 32 by means of a pair of retainers 34, one of which bears against a washer 35 and the other of which bears against a nut 36 on the outer end of the threaded rod portion 31. The nut 36 secures the various parts of the piston 20 together against a shoulder 37 on the rod 21.

Fluid, preferably oil, is supplied to the left side of the piston 20, as viewed in Figure 4, through a port 40 in the detachable head 14. The port 40 is threaded to receive a suitable fitting (not shown), by which an oil supply line can be attached to the cylinder.

Fluid is supplied to the cylinder on the right side of the piston through a second port 41, formed in an extension 42 of the cylinder casting 10 and threaded to receive a suitable oil line fitting. A passageway 43 is cored within the casting extension 42 and extends axially along the side of the pressure chamber 12 and communicates with the latter through an opening 44 at the opposite end of the chamber 12.

Thus, it is evident when fluid under pressure is supplied through the port 40 and fluid is allowed to escape through the port 41, the piston member 11 will move toward the right in the cylinder member 10. Conversely, when pressure is applied to the port 41 and fluid is released from the port 40, the piston member 11 will move toward the left in the cylinder member 10. An aperture 45 is provided in the outer wall of the passage 43 opposite the opening 44 for the purpose of letting the air out of the cylinder and also for cleaning the cylinder chamber 12 and passage 43, and the aperture 45 is threaded to receive a plug 46 which normally closes the aperture.

The cylinder member 10 is provided with supporting means in the form of a pair of laterally spaced lugs 50, formed integrally with the detachable cylinder head 14 and provided with a pair of transversely aligned holes 51 adapted to receive a mounting pin 52. The lugs 50 are spaced apart to receive therebetween a suitable mounting ear (not shown) on the tractor or on an implement associated therewith, the pin 52 being adapted to secure the lugs 50 to the ear. The pin 52 is secured in position in the apertures 51 by means of a latch pin 53 disposed within a recess 54 which intersects the aperture 51 in one of the lugs 50. The pin 52 is provided with a neck portion 55 of reduced diameter, adapted to register with the socket 54, so that the latch pin 53 lies within the annular groove 55 to lock the pin 52 against longitudinal movement within its apertures 51. The latch pin 53 is also provided with an annular groove 56 which can be moved into register with the aperture 51 by sliding the latch pin 53 within its socket 54, thereby releasing the pin 52 and providing for moving the latter out of its apertures 51. Normally, the latch pin 53 is held in locking position by means of a coil spring 58 seated within a recess in the latch pin 53 and bearing against the end of the recess 54. A securing pin 59 is inserted through a hole 60, which intersects the recess 54 in such a position that the pin 59 lies transversely in the groove 56 of the latch pin 53, thereby preventing the latter from being pushed out of its socket 54 by the spring 58. Normally, however, the outer end 61 of the latch pin 53 projects from the socket 54 and serves as a push button to shift the latch pin 53 inwardly of the socket 54 to unlock the pin 52.

The outer end of the piston rod 21 is provided with a bifurcated connector 65, rigidly secured to the end of the rod 21 and provided with a pair of laterally spaced mounting lugs 66. A coupling pin 67 is inserted through transversely aligned apertures 68 in the lugs 66 for the purpose of pivotally connecting the connector 65 to any suitable operating lever or mounting ear (not shown) on the tractor or on the associated implement. The coupling pin 67 is secured in the connector 65 by means of a latch pin 69, which is similar to the latch pin 53 at the other end of the cylinder, and since the details of construction and manner of operation are similar to those described in connection with latch pin 53, a repetition thereof is considered unnecessary.

The fluid power unit is usually mounted on the tractor or on an implement drawbar by means of the coupling pin 52, while the coupling pin 67 is usually employed for connecting the connector 65 to a control or lifting lever, so that the implement is raised to transport position by the piston moving outwardly, or to the right, as viewed in Figure 4. Conversely, the implement is lowered by moving the piston 20 inwardly toward the left within the pressure chamber 12.

As a general rule it is desired to lift the implement to a constant height for transport purposes and therefore the piston 20 moves to the extreme right hand end of the chamber 12 for raising the implement. However, the position to which the implement is lowered during operation must be adjusted from time to time, but once adjusted, it is desirable that the implement return to that same working position each time that it is lowered, such as, for example, when the cultivator or plow is lowered at the beginning of each row or furrow.

According to the present invention, this is accomplished by means of an adjustable limit stop, indicated generally by reference numeral 70, and which comprises a transverse yoke member 71, provided with a centrally disposed opening 72, through which the piston rod 21 slidably extends to the connector 65, which is disposed on the rod 21 outwardly of the yoke 71. The yoke 71 includes a pair of oppositely extending legs 73, each of which has an aperture 74 disposed parallel with the piston rod 21, and each of which receives the reduced end portion 75 of a supporting rod 76 provided with a shoulder 77 engaging the inner surface of the leg, the outer end of the threaded portion 75 receiving a nut 79 and lock washer 78. Thus, each of the supporting rods 76 is rigidly secured to its leg portion 73 of the yoke 71, and the two rods 76 extend along opposite sides of the cylinder 10, respectively. The supporting rods 76 are received within a pair of sleeve portions 85 having passages 86 therein parallel with the piston rod 21. The rods 76 are slidable axially through the passages 86, to adjust the yoke 71 axially relative to the cylinder 10.

Each of the rods 76 is provided with a row of longitudinally spaced, radially extending holes 87. The sleeve portions 85 are also each provided with a row of longitudinally spaced, radially extending holes 88, which can be brought into alignment with the holes 87 by shifting the yoke 71 and rods 76 axially of the cylinder. However, the spacing between the holes 88 in the sleeve 85 is different from the spacing between the holes 87 in the rods 76, so that only one hole 87 is in alignment with one hole 88 on each associated rod and sleeve, to provide thus a vernier adjustment of the yoke 71 axially relative to the cylinder member 10. A securing pin 90 can be inserted through each pair of aligned apertures 87, 88 to fix the yoke 71 in axially adjusted position.

Each of the pins 90 is provided with a spring clip 91 in the form of a leaf spring attached to the pin at the head of the latter and bending at right angles to lie along the sides of the sleeve portions 85 of the cylinder. The ends of the spring clips 91 are bent inwardly at 92 to engage under the sleeve portions 85 and hold the pins 90 within the holes 88.

In order to prevent the pins 90 from getting lost, they may be interconnected by a chain 94, as shown in Figure 5, which is secured to the plug 46 by means of a screw 95.

The operation of a cylinder of this type is summarized as follows:

The piston is moved toward the right in the chamber 12 by applying fluid pressure through the port 40 and allowing the fluid to be released from the port 41. The piston 20 is free to move until the washer 35 engages the closed end portion 13 of the cylinder. The piston 20 is moved toward the left by applying fluid under pressure to the port 41 and releasing fluid from the port 40. The piston 20 continues to move until the connector 65 engages the yoke 71, which is rigidly attached to the cylinder 10 by means of the pins 90 inserted through aligned apertures 87, 88 in the supporting rod 76 and the integrally formed sleeves 85 in the cylinder casting. The yoke 71 can be shifted axially of the cylinder 10 to adjust the terminal position of the piston 20 in which the connector 65 engages the yoke 71, by removing the pins 90 and shifting the yoke axially to bring other pairs of apertures 87, 88 into alignment, after which the pins 90 are reinserted into the aligned apertures and the spring clips 91 are snapped into engagement with the sleeve portions 85 to hold the pins 90 in position.

I claim:

1. A fluid power unit comprising a cylinder member, a piston member slidable therein and having a connecting rod extending out of one end of the cylinder member, and adjustable means limiting the movement of said piston member in said cylinder comprising a yoke disposed transversely of said connecting rod and provided with an opening through which said rod extends and is shiftable therethrough, stop means on said rod extending radially of the latter beyond the edge of said opening to engage said yoke in one direction of movement, a pair of supporting rods rigidly attached to said yoke and extending longitudinally along opposite sides of said cylinder member, respectively, means on opposite sides of said cylinder member apertured to slidably receive said supporting rods, respectively, and means for releasably securing at least one of said supporting rods to said apertured means in longitudinally adjusted position.

2. A fluid power unit comprising a cylinder member, a piston member slidable therein and having a connecting rod extending out of one end of the cylinder member, and adjustable means limiting the movement of said piston member in said cylinder comprising a yoke disposed transversely of said connecting rod, stop means on said rod engageable with said yoke in one direction of movement, a pair of supporting rods rigidly attached to said yoke and extending longitudinally along opposite sides of said cylinder member, respectively, means on opposite sides of said cylinder member apertured to slidably receive said supporting rods, respectively, and means for releasably securing at least one of said supporting rods to said apertured means in longitudinally adjusted position, said securing means comprises a pin, one of said supporting rods having a row of axially spaced, radially extending apertures adapted to receive said pin and said apertured rod receiving means having a plurality of apertures transversely intersecting the rod receiving aperture and adapted to register with said apertures in said rod by shifting the latter axially of said cylinder, the spacing between said apertures in said rod receiving means and in said rod being different in order to obtain a vernier adjustment of said yoke longitudinally of said cylinder.

3. A fluid power unit comprising a cylinder member, a piston member slidable therein and having a connecting rod extending out of one end of the cylinder member and a connector at the outer end of said rod, and adjustable means limiting the movement of said piston member in said cylinder comprising a yoke disposed transversely of said connecting rod and provided with an opening through which said rod extends and is shiftable therethrough, said connector being engaged by said yoke when said piston moves toward the opposite end of the cylinder, a pair of supporting rods rigidly attached to said yoke and extending longitudinally along opposite sides of said cylinder member, respectively, means on opposite sides of said cylinder member apertured to slidably receive said supporting rods, respectively, and means for releasably securing at least one of said supporting rods to said apertured means in longitudinally adjusted position.

4. A fluid power unit comprising a cylinder member, a piston member slidable therein and having a connecting rod extending out of one end of the cylinder member and a connector at the outer end of said rod, and adjustable means limiting the movement of said piston member in said cylinder comprising a yoke disposed transversely of said connecting rod and provided with an opening through which said rod extends and is shiftable therethrough, said connector being engaged by said yoke when said piston moves toward the opposite end of the cylinder, a pair of supporting rods rigidly attached to said yoke and extending longitudinally along opposite sides of said cylinder member, respectively, a pair of axially extending sleeves attached to said cylinder on opposite sides thereof and adapted to slidably receive said supporting rods, respectively, at least one of said rods having a row of longitudinally spaced radially extending apertures and the associated sleeve having a row of apertures extending radially therethrough and alignable with said apertures in said rod, the spacing between said apertures in said sleeve and in said rod being different in order to obtain a vernier adjustment of said yoke longitudinally of said cylinder.

ELMER McCORMICK.

REFERENCES CITED

The following references are of record in the file of this patent:

UNITED STATES PATENTS

| Number | Name | Date |
| --- | --- | --- |
| 230,429 | McGowan | July 27, 1880 |
| 1,686,109 | Stuckey | Oct. 2, 1928 |
| 1,895,732 | Rosenkranz | Jan. 31, 1933 |
| 2,275,758 | Harris | Mar. 10, 1942 |
| 2,354,036 | Mainwaring | July 18, 1944 |

FOREIGN PATENTS

| Number | Country | Date |
| --- | --- | --- |
| 527,074 | Great Britain | Oct. 2, 1940 |